United States Patent
Brookes et al.

(10) Patent No.: US 8,756,134 B2
(45) Date of Patent: Jun. 17, 2014

(54) METHOD OF PROVIDING INSURANCE INFORMATION

(76) Inventors: Michael J. Brookes, Brielle, NJ (US); Jean C. Avery, Spring Lake, NJ (US)

( * ) Notice: Subject to any disclaimer, the term of this patent is extended or adjusted under 35 U.S.C. 154(b) by 138 days.

(21) Appl. No.: 13/372,587

(22) Filed: Feb. 14, 2012

(65) Prior Publication Data
US 2012/0209633 A1      Aug. 16, 2012

Related U.S. Application Data

(60) Provisional application No. 61/443,516, filed on Feb. 16, 2011.

(51) Int. Cl.
*G06Q 40/00*      (2012.01)
(52) U.S. Cl.
USPC .................................................. 705/35; 705/4
(58) Field of Classification Search
USPC .................................................. 705/4, 35–40
See application file for complete search history.

(56) References Cited

U.S. PATENT DOCUMENTS

2002/0002475 A1    1/2002  Freedman et al.
2011/0166893 A1 *  7/2011  McConnell et al. .............. 705/4

* cited by examiner

*Primary Examiner* — Thu Thao Havan
(74) *Attorney, Agent, or Firm* — Florek & Endres PLLC

(57) ABSTRACT

A method of providing insurance on one or more objects owned by the same or different owners and having object information related to the objects in a database maintained by a party for a purpose independent of providing insurance, including creating object insurance information from the object information in the database for one or more of the objects, electronically transferring the object insurance information on one or more of the objects to a carrier capable of providing insurance quotes and coverage, generating an insurance quote for one or more of the objects, the insurance quote being based at least in part on the object insurance information submitted, and presenting the quote to an owner of an object for acceptance. The method may include providing the owner with the quote electronically and including a link to bind coverage, with payments arranged automatically on a regular schedule.

19 Claims, No Drawings

METHOD OF PROVIDING INSURANCE INFORMATION

FIELD OF THE INVENTION

The present invention is related to the field of insurance, and more particularly the field of obtaining quotes, obtaining coverage and paying for insurance for a plurality of insured persons, items or properties and assigning the costs for a particular person, item or property to the particular person, item or property.

BACKGROUND OF THE INVENTION

Obtaining insurance has virtually always required obtaining a quote from an insurance agent on a particular person, item or property, including such things as health and long term disability for persons, personal property including vehicles and possessions, or real property, (persons, items and/or property on which insurance coverage is sought/obtained is hereinafter referred to as "object"). A unique person or entity with an insurable interest in the object ("owner") seeking insurance provides the agent with specific information related to an individual object required for writing bindable insurance coverage ("object information") for the individual object. The agent contacts one or more insurance companies or insurers ("carriers") with the object Information and provides one or more quotes to the owner. If the owner wishes to bind coverage on the object, it accepts coverage and pays the required premiums on a quarterly, semi-annual or annual basis.

When a number of objects are to be covered, the owner must prepare and provide the object information for each of the objects to the carrier for quotes. If coverage is accepted and the carrier is bound, the owner keeps internal records of the cost of the insurance for each of the individual objects and pays the premiums.

As such, the method currently in use is not significantly different when the owner seeks to obtain coverage on a plurality of objects than when the owner seeks to obtain coverage on a single object, other than the fact that the owner may provide object information on more than one object in a single telephone call, letter, email, etc., to the agent. The remaining requirements of paying required premiums on a quarterly, semi-annual or annual basis and keeping records of the insurance obtained for each of the objects is the same.

The present invention therefore seeks to improve the method used to obtain quotes, obtain coverage and pay for insurance for one or more of a plurality of objects with object information contained in a common database and assigning the costs to a particular object for one or a plurality of owners.

SUMMARY OF THE INVENTION

The present invention is directed to a method of providing insurance information for quotes on insuring a plurality of objects, such as persons (including but not limited to health, disability and life insurance), personal property (including vehicles, boats, jewelry, etc.), real property (including such things as co-op properties, apartments, subdivided properties) and the like, the objects being owned by the same or different owners.

The method includes electronically transferring object insurance information created from object information stored on a party's database to a carrier capable of providing insurance quotes and coverage on one or more of a plurality of objects, the party's database having object information for a plurality of objects and a plurality of owners, generating an insurance quote on one or more of the plurality of objects based at least in part on the object insurance information submitted, and presenting the quote to an owner for acceptance. The method preferably also includes the owner accepting one or more of the quotes, paying an insurance premium on a regular schedule and/or apportioning the insurance cost to the object on a user determinable period shorter than the payment interval.

In its most preferred embodiment, the owner with an insurable interest has object information, including some or all of the information required for obtaining insurance coverage quotes, as well as other information, in a dedicated object account maintained by a related or third party ("party"). The object account can take any form, such as one or more files dedicated to the object maintained by the party, but is preferably accessible by the owner through independent means associated with the particular object, such as an identification, debit or credit card, electronic fob, flash drive or similar information access/storage/retrieval device. The party maintains the owner's object information in a database along with the object information on a number of similar objects with the same and different owners.

The object information related to one or more of the plurality of objects can be electronically transferred, by transmission, submission, or the like, from the party's database to the carrier by any known method, including as an attachment to electronic mail, internet connection, by a data link, on electronic storage media, or any other means known or developed. Although the object information may be transferred by the party to the carrier directly, the information may be transferred by an intermediary associated with the party to the carrier or an agent or other designee of the carrier. Similarly, the intermediary, carrier or agent may be given access to the party's database by the party for transfer of the object insurance information. In describing the invention, reference to the party will be understood to include any intermediary and reference to the carrier will be understood to include any agent.

For example, in the most preferred embodiment, the party itself or through an intermediary utilizes a data link with an associated computer program that draws predetermined object insurance information for a plurality of objects from the object information contained in the related object accounts maintained by the party. The object insurance information is retrieved in or converted to a format that a carrier can use to generate and/or include in generating a quote, either as transferred to the carrier or at the carrier.

Of course, if the object information contained in the object account is not sufficient for obtaining a bindable insurance quote, the owner can be prompted to provide any additional information to make up the object insurance information by the party and/or its intermediary, the carrier, or other interested person or entity. In this regard, if the additional information is available from other than the owner, the party and/or its intermediary, or other interested party can provide the additional information to the carrier or its agent.

The carrier is then able to generate a quote for one or more of the objects on which object information was sent to it by the party and/or intermediary for consideration. The quote may include one or more of the objects for which object information was provided, however, preferably includes individual quotes for each of the individual objects for which object information was sent.

The quotes are preferably sent electronically, such as through a data link from the carrier or its agent to the party or its intermediary, and the party presents the quotes to the owners of the objects. This can be done on the owner's object account pages that are directly accessible by the owners. Alternatively, the quotes can be provided via email or other form, and can be sent directly from the carrier or its agent to the owner if desired and the proper authorization has been granted.

The owners are then given the opportunity to accept one or more of the quotes for one or more of the particular objects. When the quotes are sent electronically, it is preferred that the owners be provided with the ability to also accept and bind coverage electronically, i.e., thorough the use of a return link or a button to click in an email, on a website or through a secure link. Upon acceptance it is preferred that the owner can print an insurance card or other proof of insurance certificate at their own computer.

Once coverage has been accepted, the carrier and/or party arranges for payment of the premium by the owner on a regular schedule. Although the regular schedule may be defined by any period, it is contemplated that the regular schedule be monthly. Moreover, although any payment method may be used, it is preferred that the payments be made electronically, either by the carrier debiting the owner's account maintained by the party or by the party initiating an electronic transfer to the carrier's account and debiting the owner's account accordingly. Alternatively, or if the owner does not have a monetary account with the party, the carrier can automatically debit the owner's bank or credit card account.

The amount of the payment related to a particular object is then apportioned within the particular object's object account on a short term interval. For example, the owner would be able to access the object account maintained by the party to view the insurance cost of the object on a monthly, weekly, daily or other short term period. This permits the owner to associate short term costs to particular events or circumstances, such as by delivery to a particular customer, so that the insurance cost may be factored with other costs for the event or circumstance.

The method can be applied to a variety of parties and/or objects without limitation. For example but without limitation, the method can be used for cars, trucks, ATVs, recreational vehicles or boats with the particular vehicles as the objects, and would be particularly suitable with a fleet of vehicles or related owner/operator vehicles that are included in a group database; homeowners, renter or commercial property insurance, including personal property or the like, with the home and/or property as the object; general obligation insurance, director and officer or malpractice insurance with the business or activity as the object; health, life or disability insurance with employees, consultants or members on a corporate or group database, etc.

The commonality of the database, including object information associated with each of the similar objects, permits the party or intermediary to submit a group of objects for the best pricing and preferred billing arrangements, i.e., monthly billing rather than quarterly, semi-annual or annual billing. The common database with various object accounts related to the particular objects permits apportionment of the insurance costs to the particular objects and further permits the party, intermediary and/or owner to associate a portion of the costs related to particular events and or circumstances.

In its most preferred embodiment, the owner can use the information on the party's database associated with the object accounts for tracking, billing, analyzing, reporting and the like. As such, the costs of the insurance can be passed to an owner or an owner's customer, etc., based on the preferred billing arrangements.

DETAILED DESCRIPTION OF THE PREFERRED EMBODIMENT

The present invention is directed to a method of providing insurance on one or more objects, the objects being owned by the same or different owners, comprising the steps of electronically transmitting object insurance information based on object information stored on a party's database to a carrier for procuring insurance quotes and coverage on one or more of a plurality of objects, the party's database having object information for a plurality of objects and a plurality of owners, generating an insurance quote on one or more of the plurality of objects based at least in part on the object insurance information transmitted, and presenting the quote to an owner for acceptance. The method preferably also includes the owner accepting one or more of the quotes, paying an insurance premium on a regular schedule and/or electronically apportioning the insurance cost to the object on a short term interval.

Although the system of the present invention can be performed for use with a variety of parties and/or intermediaries and/or owners, and a variety of similar objects with the same and/or different owners, as generally discussed above, it will be described here with respect to a party that provides vehicle fleet or owner/operator services through separate accounts. An example of such a party is Pilot Flying J, which provides accounts for fleet owners/operators to charge and be billed for fuel, vehicle parts and service, food/snacks, sundry items, and the similar travel center goods and services ("account charges").

Vehicle fleet services provided by such companies as Pilot Flying J maintain accounts related to participating fleet vehicles by owner and/or object in a database. Generally, the accounts have associated account cards that represent the vehicle and provide the fleet owner/operator, considered "owners" when referenced here, with credit card and related billing services for account charges, such as the Fleet Card and/or TCH Cards offered by Pilot Flying J. The accounts are created and maintained in the database with account information that includes, or can be caused to include, object information, at least some of which may be used as object insurance information required by a carrier for binding insurance coverage. In this regard, the user accessible account information can include a tab or other section, or can be linked to a site or form, for the owner to fill out any additional required object insurance information.

For example, the object information for an object in the form of a fleet truck would likely include information such as the vehicle owner or leasing information including name, address and contact information, the vehicle identification number, the make and model, the vehicle mileage, and/or any other information that may or may not be used by a carrier to price and bind insurance coverage. This information could be available as part of information maintained on the account or can be entered by the owner when setting up or updating the account, or supplemented at the time a quote request is made.

The party having the database with accounts on file, and/or an intermediary, electronically transmits, either by initiating or having authorized another to initiate, the object insurance information from the database for one or more of the vehicles that have an account to an insurance carrier, or its agent, for providing a quote on each of the one or more vehicles. Any electronic transfer would fall within the spirit of the present invention, however, email, electronic transfer over the Internet using a secure web site, through a login portal, over a data link or the like is most preferred.

In the most preferred embodiment, the party, itself or through an intermediary, or the carrier or agent utilizes a data link with an associated computer program that draws only the object insurance information required to bind insurance coverage for a plurality of objects from the object information in the database maintained by the party. The object insurance information is retrieved in or converted to a format that a carrier can use to generate and/or include in a quote, and is transmitted to the carrier. Alternatively, but intended to be included in this description, is where the object insurance information is transmitted to the carrier and is then converted into a format that the carrier can use to generate the quote.

Of course, if the object information contained in the object account is not sufficient for obtaining the object insurance information needed to generate bindable insurance quote, the owner can be prompted to provide any additional information by the party and/or its intermediary, the carrier, or other interested person or entity, such as an agent. This can be done by the party and/or its intermediary at the time the data is being transferred or by the carrier after receiving the information which the carrier determines is insufficient to bind coverage.

In providing the object insurance information it is understood that the information can be transmitted to an agent for the carrier, but it is preferred that the information be provided to the carrier directly. Of course, if the object insurance information is sent directly to the carrier it can avoid the insurance agent's commissions and the savings can be passed on to the party and/or its intermediary and the owners. Alternatively, if insurance agents are used, they can be given commissions reflecting the origination of the business through the relationship between the carrier and the party and/or the intermediary directly.

Moreover, the object insurance information can be sent to one or more carriers, depending on the facts and circumstances, to obtain the best coverage at the lowest premium. For example, one carrier may be preferred for trucks while another is preferred for automobiles. Or if multiple carriers are involved, the owner may be given the option to choose between quotes from the multiple carriers.

Once the object insurance information is received, the carrier generates or provides quotes for binding coverage on one or more of the vehicles. For example, the carrier could choose not to provide a quote on a vehicle if there is a particular factor that precludes coverage by the carrier. Otherwise, the carrier will provide quotes on the vehicles and permit the owner to bind or reject coverage. The method used for the carrier to create the quotes can be any suitable method, including but not limited to employees manually creating the quotes based on the information. However, it is preferred that the method for creating the quotes be automated at least in part, using established parameters based on the object information provided, to make the quote process more efficient and timely.

Although any method of binding coverage may be used, it is preferred if the coverage can be accepted and bound electronically. For example, acceptance can be made through a link in an email quoting coverage or, most preferably, by clicking on a dedicate acceptance button within a secure web site or user portal, such as when the owner logs onto its Pilot Flying J account. Moreover, in the preferred embodiment the owner/operator would be able to print out proof of insurance, such as an insurance card for the vehicle being insured, at their own computer.

In a preferred embodiment, the quote information is available from the carrier on the owner's login page for its account, providing a running quote for the insurance on its vehicles, through a reverse data link or the like. This would permit the owner to accept coverage at any time, and would provide continuous quotes, including for exception reports of changed information, when a vehicle is taken out of service and upgraded with a different make, model and/or year vehicle. Additionally, it would permit the party to transfer the object insurance information without the owner's identity, to provide a higher level of confidentiality to the owner, for example, when providing unsolicited insurance quotes to the owners.

Once coverage has been accepted, the cost of the premium is preferably charged to the owner's account related to that vehicle, like other account charges, and is billed accordingly. In charging the account, the charge can be made by the party and/or the intermediary, collecting the premiums and forwarding them to the carrier, or by the carrier itself, as an authorized vendor on the account. Most preferably, the premiums are billed on regular intervals, for receipt of payment in advance of the period for which the premium is applied.

In this regard, it is preferred that the premiums for the present trucking example are broken down and billed monthly, to create a more favorable cash flow for the vehicle owners/fleet operators. It also allows the vehicle owner/fleet operator to more carefully assess the costs to particular events or circumstances. For example, if the costs for a particular trip taking half of the month are to be accounted for.

It is further contemplated that the party can include even more detailed cost information if desired by the party and/or the owner. This could take the form of a daily cost breakdown shown on the owner's account so the owner can apportion costs to a particular job on a daily basis. Of course, such information will allow the owner to more carefully price and bill for jobs using the vehicle(s).

To enhance the ability of the owner to determine coverage and costs, it is most preferred that the owner be permitted to log onto their account where the insurance cost and/or billing information is available. It is also preferred that the owner be able to determine how the information is presented when the owner logs in, and for the owner to be able to obtain reports based on user determinable parameters. Such capabilities, and the like, are intended to assist the owner in pricing, billing, accounting and generally keeping track of and paying for their vehicle related expenses.

Of course, the method of the present invention can be performed by the party, an intermediary providing the data link functions or the carrier directly, in conjunction with the owner. In this regard, the above description would be only slightly modified if performed by, for example, the carrier, which would use steps such as receiving electronic information from an owner account, generating a quote, receiving an acceptance and binding coverage, charging a portion of the premium to the owner's account on a regular schedule party. The additional ability for the owner to break down the premiums user determined events and/or circumstances can be performed through the carrier or through the party or the party's representative when the owner accesses its account.

Moreover, the method of the present invention can be equally applicable to other parties that maintain object information on similar objects to be insured. For example, and without limitation, this may include groups such as the American Automobile Association ("Triple A" or "AAA") using its database of member's personal and automobile information to permit a carrier to quote automobile insurance, the American Association of Retired Persons ("AARP") using its database of members personal information to permit a carrier to quote life insurance, where the object may be the owner's life, the Screen Actors Guild using its database of member's personal information to permit a carrier to quote health insurance, where the object may be the owner's health, Zillow using its database of home information for providing homeowner's insurance to the homeowners, etc. Of course, if such parties do not have billing accounts with the owners, such as with Zillow, automatic debiting of an owner's bank or credit card account can be used for payment.

Variations, modifications and alterations to the preferred embodiment of the present invention described above will make themselves apparent to those skilled in the art. All of these are intended to fall within the spirit and scope of the present invention, limited solely by the appended claims.

The invention claimed is:

1. A method of providing insurance on one or more objects, the objects being owned by the same or different owners and having object information related to the objects stored in a database maintained by a party for a purpose independent of providing object insurance information, the method comprising:
   a. electronically obtaining object insurance information from the object information in the database for one or more of the objects, said database containing account information directly electronically accessible by an owner of one or more objects;
   b. electronically transferring the electronic object insurance information on one or more of the objects to a carrier capable of providing insurance quotes and coverage;
   c. generating an insurance quote for one or more of the objects, the insurance quote being based at least in part on the electronic object insurance information submitted; and
   d. presenting the quote to an owner of an object for acceptance.

2. The method of claim 1 wherein the quote is presented to the owner of an object electronically.

3. The method of claim 2 wherein the electronic presentation of the quote includes a link for an owner to accept the quote and bind coverage.

4. The method of claim 1 further comprising prompting the owner for additional object insurance information prior to the carrier generating a quote.

5. The method of claim 1 further comprising the step of accepting coverage from the carrier by the owner.

6. The method of claim 5 further comprising arranging for payment of a premium on a regular basis by automatic payment.

7. The method of claim 6 wherein the automatic payment is taken from the group consisting of debiting an owner account maintained by the party, debiting an owner bank account, debiting an owner credit card account.

8. The method of claim 6 further comprising the step of apportioning the payment on a period shorter than the regular basis on which automatic payment is made.

9. The method of claim 8 wherein the period is determinable by the owner.

10. The method of claim 1 wherein the object insurance information is converted to a form usable by the carrier prior to transfer to the carrier.

11. The method of claim 1 wherein the object insurance information is converted to a form usable by the carrier at the carrier.

12. The method of claim 6 wherein the payment is apportioned to a particular object being insured.

13. The method of claim 1 wherein the object to be insured is taken from the group consisting of trucks, cars, boats, ATVs, recreational vehicles, real property and improvements, commercial property, personal property, general obligation, malpractice, director and officer, health, life and disability.

14. The method of claim 1 wherein electronic object insurance information on more than one object owned by an owner is electronically transferred to a carrier and the presentation of a quote is for more than one object.

15. The method of claim 1 wherein the object insurance information is transferred by at least one of the group consisting of a data link, email, internet connection and electronic storage media.

16. The method of claim 1 wherein the object insurance information is sent to more than one carrier to obtain competitive quotes.

17. The method of claim 1 wherein the insurance quote is generated automatically by the carrier.

18. The method of claim 1 wherein the insurance quote is provided by the carrier to the party for presentation to the owner.

19. The method of claim 5 wherein the owner can print proof of insurance upon accepting coverage.

* * * * *